(12) United States Patent
Terada et al.

(10) Patent No.: US 7,869,548 B2
(45) Date of Patent: Jan. 11, 2011

(54) ULTRA-WIDEBAND RECEIVER

(75) Inventors: Takahide Terada, Nishitokyo (JP);
Shingo Yoshizumi, Yokohama (JP);
Tadahiro Kuroda, Tokyo (JP)

(73) Assignee: Semiconductor Technology Academic Research Center, Yokohama-Shi, Kanagawa (JP)

(*) Notice: Subject to any disclaimer, the term of this patent is extended or adjusted under 35 U.S.C. 154(b) by 874 days.

(21) Appl. No.: 11/051,630

(22) Filed: Jan. 27, 2005

(65) Prior Publication Data

US 2005/0213635 A1    Sep. 29, 2005

(30) Foreign Application Priority Data

Jan. 30, 2004    (JP) .................. 2004-23897

(51) Int. Cl.
*H04L 27/06* (2006.01)
(52) U.S. Cl. .................. 375/345; 375/326; 375/339
(58) Field of Classification Search .................. 375/316, 375/327, 344, 345, 326, 339
See application file for complete search history.

(56) References Cited

U.S. PATENT DOCUMENTS

| | | | | |
|---|---|---|---|---|
| 4,922,461 A * | 5/1990 | Hayakawa et al. | ...... | 365/230.08 |
| 5,355,126 A * | 10/1994 | Nelson et al. | ............. | 340/7.25 |
| 5,448,202 A * | 9/1995 | Owen | .................. | 329/323 |
| 5,621,767 A * | 4/1997 | Brandt et al. | ............. | 375/344 |
| 5,778,311 A * | 7/1998 | Nakanishi | ............. | 455/343.4 |
| 5,926,750 A * | 7/1999 | Ishii | .................. | 455/130 |
| 5,999,830 A * | 12/1999 | Taniguchi et al. | ........... | 455/574 |
| 6,070,062 A * | 5/2000 | Yoshida et al. | .......... | 455/234.1 |
| 6,195,400 B1 * | 2/2001 | Maeda | .................. | 375/327 |
| 6,314,083 B1 * | 11/2001 | Kishimoto et al. | .......... | 370/210 |
| 6,552,677 B2 * | 4/2003 | Barnes et al. | .......... | 342/22 |
| 6,571,088 B1 * | 5/2003 | Hasegawa | ............. | 455/182.2 |
| 6,614,855 B1 * | 9/2003 | Okamoto | ............. | 375/316 |
| 6,654,900 B1 * | 11/2003 | Cave | .................. | 713/501 |
| 6,771,720 B1 * | 8/2004 | Yang et al. | .......... | 375/345 |
| 6,781,470 B2 * | 8/2004 | Rogerson | ............. | 331/57 |

(Continued)

FOREIGN PATENT DOCUMENTS

JP    2003-101509 A    4/2003

(Continued)

OTHER PUBLICATIONS

Han et al., "A new ultra-wideband, ultra-short monocycle pulse generator with reduced ringing", IEEE Microwave and Wireless Components Letters, vol. 12, No. 6, Jun. 2002, pp. 206-208.

(Continued)

*Primary Examiner*—Emmanuel Bayard
(74) *Attorney, Agent, or Firm*—Birch, Stewart, Kolasch & Birch, LLP

(57) ABSTRACT

In an ultra-wideband receiver for receiving discontinuous pulse signals and for demodulating the receive signals, an amplifier amplifies signals received, and a demodulator demodulates the amplified signals. A controller controls the demodulator and the amplifier based on the signals demodulated by the demodulator. The controller sends a signal to the amplifier to activate the amplifier only when the signals are received in order to decrease the power consumption in the amplifier. Further, the demodulator demodulates the amplified signals by generating a plurality of single pulses as template pulses, multiplies the amplified signals with the plurality of signal pulses, and integrates the multiplied signals to obtain demodulated data.

8 Claims, 15 Drawing Sheets

U.S. PATENT DOCUMENTS

| | | | |
|---|---|---|---|
| 6,925,108 B1 * | 8/2005 | Miller et al. | 375/150 |
| 7,072,424 B2 * | 7/2006 | Forrester | 375/316 |
| 7,079,604 B1 * | 7/2006 | Miller et al. | 375/343 |
| 2002/0146080 A1 | 10/2002 | Dress et al. | |
| 2004/0036637 A1 * | 2/2004 | Singvall et al. | 341/138 |
| 2005/0070325 A1 * | 3/2005 | Bellaouar et al. | 455/550.1 |
| 2005/0078734 A1 * | 4/2005 | Baker et al. | 375/130 |
| 2005/0259720 A1 * | 11/2005 | McCorkle et al. | 375/130 |
| 2008/0151967 A1 * | 6/2008 | Fullerton et al. | 375/145 |

FOREIGN PATENT DOCUMENTS

| WO | WO-03/101536 A1 | 12/2003 |
|---|---|---|

OTHER PUBLICATIONS

Kim et al.. "Design of CMOS Scholtz's monocycle pulse generator", 2003 Conference on Ultra Wideband Systems and Technologies, pp. 81-85.

Immoreev et al., "Ultra-wideband and communication systems with high data rate", 2002 IEEE International Workshop o the Ultra-Wideband and Ultra Short Impulse Signals.

Fleming et al., "Rapid acquisition for ultra-wideband localizers", 2002 IEEE Conference on Ultra Wideband Systems and Technologies, pp. 245-249.

Lee et al., "Ranging in a dense multipath environment using an UWB radio link", IEEE Journal on Selected Areas in Communications, vol. 20, No. 9, Dec. 2000, pp. 1677-1683.

\* cited by examiner

ULTRA-WIDEBAND RECEIVER

BACKGROUND OF THE INVENTION

The invention relates to an ultra-wideband receiver for ultra-wide band radio transmission which uses discontinuous pulse signals as transmission signals.

In an analog front end circuit in an ultra-wideband receiver, an amplifier is a block which consumes an electric power most. Therefore, in order to reduce the power consumption in the receiver, it is effective to decrease the electric power consumed in the amplifier. In a narrowband radio transmission, a transmitted signal is in the form of a continuous wave because data is transmitted on a carrier wave. Therefore, a large current always flows through the amplifier in the receiver, and this makes the power consumption very large. On the contrary, in the ultra-wideband transmission, a carrier wave is not used, and the transmitted signals are made of discontinuous short pulses. (For example, refer to Jeongwoo Han and Cam Nguyen, A New Ultra-Wideband, Ultra-Short Monocycle Pulse Generator with Reduced Ringing, Microwave and Wireless Components Letters, Vol. 12, (2002) pp. 206-208 (IEEE); Hyunseok Kim, Dongwon Park and Youngjoong Joo, Design of CMOS Scholtz's Monocycle Pulse Generator, 2003 IEEE Conference on Ultra Wideband Systems and Technologies (UWBST 2003), pp. 81-85; Igor J. Immoreev, Alexander A. Sudakov, Ultra-Wideband Communication System with High Data Rate, 2002 IEEE International Workshop on The Ultra Wideband and Ultra Short Impulse Signals (UWBUSIS 2002); Robert Fleming, Cherie Kushner, Gary Roberts and Uday Nandiwada, Rapid Acquisition for Ultra-Wideband Localizers, 2002 IEEE Conference on Ultra Wideband Systems and Technologies (UWBST 2002) pp. 245-249; Joon-Yong Lee and Robert A. Scholtz, Ranging in a Dense Multipath Environment Using an UWB Radio Link, IEEE JOURNAL ON SELECTED AREAS IN COMMUNICATIONS, Vol. 20, No. 9 (2002) pp. 1677-1683, and US-A 2002/0146080.)

In a prior art ultra-wideband receiver which uses discontinuous pulse signals for transmission signals, an amplifier amplifies a pair of receive pulse signal RFi and its counterpart/RFi, and a mixer multiplies the two signals with template signals generated by a template pulse generator. The template signals are used for determining the correlation with the received pulse signals. Previously, the template signals are discontinuous pulse signals similarly to the receive pulse signals.

As mentioned above, in a prior art ultra-wideband receiver which uses discontinuous short pulses for transmission, the amplifier consuming a large electric power is kept operated, and it consumes the electric power inefficiently. Therefore, it is desirable to reduce the consumption of electric power in the amplifier in the ultra-wideband receiver. Further, in order to generate template signals having the same waveforms as the input pulse signals, a complicated circuit including a pulse generator, a filter and the like is used, and this also enhances the power consumption in the receiver. Then, it is also desirable to reduce the consumption of electric power on this point.

SUMMARY OF THE INVENTION

An object of the invention is to provide an ultra-wideband receiver circuit having lower consumption of electric power.

In an ultra-wideband receiver according to the invention for receiving discontinuous pulse signals and for demodulating the receive signals, an amplifier amplifies signals received, and a demodulator demodulates the amplified signals. A controller controls the demodulator and the amplifier based on the signals demodulated by the demodulator. The controller sends a control signal to the amplifier to activate the amplifier only when the signals are received. Thus, the power consumption in the amplifier is decreased. Further, the demodulator demodulates the amplified signal, by multiplying the amplified signal with a plurality of signal pulses as template pulses, and by integrating each of the multiplied signals to obtain demodulated data. The single pulses used as template pulses are, for example, gaussian pulses or rectangular pulses generated by a digital circuit. Thus, the circuit structure is simplified.

An advantage of the present invention is that the consumption of electric power in the ultra-wideband receiver can be decreased to a large extent.

Another advantage of the invention is that a circuit structure of the ultra-wideband receiver can be simplified.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
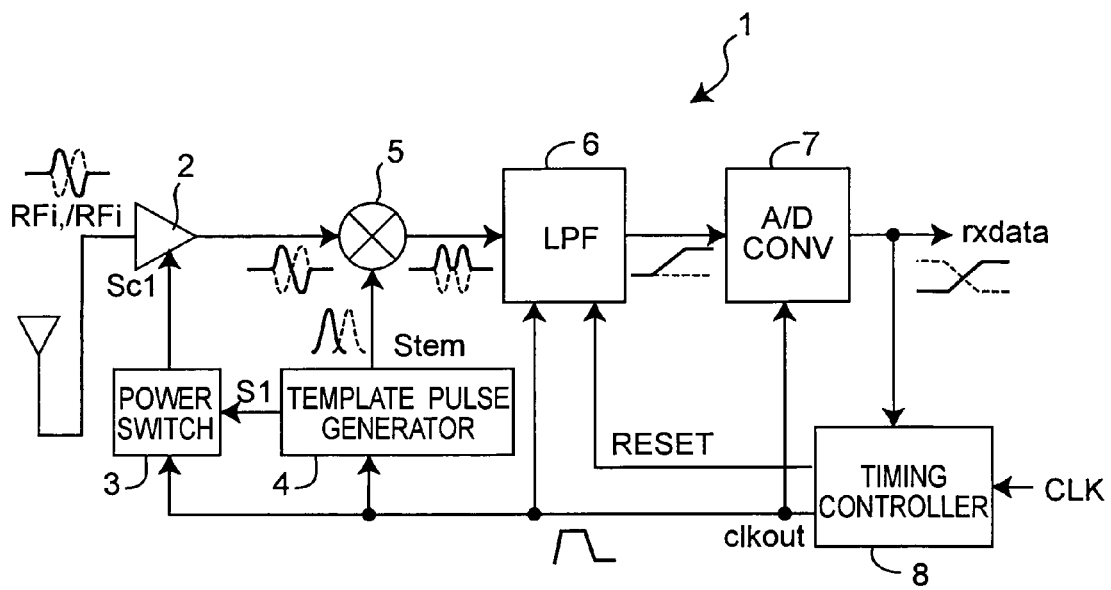
FIG. 1 is a circuit diagram of an ultra-wideband (UWB) receiver according to an embodiment.

Referring now to the drawings, wherein like reference characters designate like or corresponding parts throughout the several views, FIG. 1 shows an ultra-wideband (UWB) receiver 1 for UWB transmission according to an embodiment of the invention which uses discontinuous pulse signals for transmission. An amplifier 2, which is a low noise amplifier, amplifies a pair of signals RFi and /RFi received through an antenna to output a pair of amplified signals So and /So, respectively. The latter signal /RFi has a phase inverted from that of the signal RFi. (A prefix "/" before a signal name represents a phase-inverted analog signal in this description.) A switch 3 sends a control signal Sc1 to the amplifier 2. A template pulse generator 4 generates template signals $S_{tem}$ which are discontinuous pulse signals used for detecting correlation of the receive signals RFi and /RFi. A mixer 5 multiplies the output signals So and /So with the template signals $S_{tem}$, respectively. A low pass filter (LPF) 6 integrates the signals received from the mixer 5, and an analog-to-digital (A/D) converter 7 converts the input analog signals from the low pass filter 6 to output digital signals rxdata. A timing controller 8 generates and sends a timing signal clkout to the switch 3, template pulse generator 4, low pass filter 6 and A/D converter 7 based on a clock signal CLK and the output signal rxdata from the A/D converter 7. The switch 3 supplies the control signal Sc1 to the amplifier 2 based on the signal clkout from the timing controller 8 and a signal S1 from the template pulse generator 4. The UWB receiver consists mostly of logic circuits except the amplifier 2, the mixer 5 and the like.

The above-mentioned UWB receiver 1 has following functional blocks: the amplifier 2 for amplifying received signals, a demodulator 4-7 for demodulating the amplified signal, and a controller for controlling the demodulator 4-7 and the amplifier 2. The controller includes a timing signal controller 8 for sending the timing signal clkout to each components 4-7 in the demodulator based on the signal demodulated by the demodulator. The controller further has a control signal generator which generates the control signal Sc1, consisting of the timing controller 8, a part of the template pulse generator 4 and the switch 3 which sends the control signal S1 to the switch 3. That is, the control signal generator sends the control signal Sc1 to the amplifier 2 to activate it only when the input signals RFi, /RFi are received. In the demodulator, the mixer 5 multiplies the signals So, /So amplified by the amplifier 2 with a plurality of single pulses generated by the template pulse generator 4. The multiplied signals Sa, /Sa are integrated by the low pass filter 6, and the integrated signals are converted to a digital value rxdata by the A/D converter 7.

The amplifier 2 is activated or deactivated according to the control signal Sc1 received from the switch 3. While the amplifier 2 is deactivated, the power consumption in the amplifier 2 becomes low. When the switch 3 receives a timing signal clkout of a predetermined signal level, it outputs the as-received timing signal clkout to the amplifier 2 until a timing signal S1 of a predetermined signal level is received from the template pulse generator 4. When the input timing signal of the predetermined signal level is received, the template pulse generator 4 generates single pulses in a form such as a gaussian pulse or a rectangular pulse and outputs them as template signals $S_{tem}$. The timing controller 8 delays the input clock signal CLK from a clock oscillator (not shown) to generate the timing signal clkout. The delay time is changed, as explained below, until a normal bi-level signal can be detected based on the output signals rxdata of the A/D converter 7.

Figure 2:
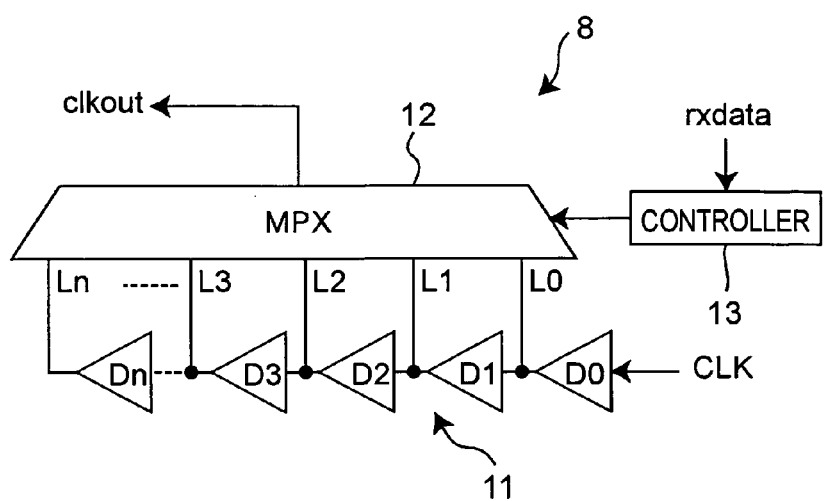
FIG. 2 is a circuit diagram of a timing controller in the UWB receiver.

FIG. 2 shows an example of an internal structure of the timing controller 8 only on a circuit for generating the timing signal clkout. The sliding correlation method is used to track the synchronization in this example. The timing controller 8 consists of delay lines and a control circuit. The timing generator 8 has delay elements 11, a multiplexer (MPX) 12 and a controller 13 for controlling the multiplexer 12. In the delay elements 11, delay elements $D_0$ to $D_n$, wherein n denotes a positive integer, are connected in series. An input terminal of the first delay element $D_0$ receives a clock signal CLK from a clock oscillator (not shown), and each output terminal of the delay elements 11 is connected to a corresponding input terminal of the multiplexer 12. The controller 13 controls the multiplexer 12 according to the input signal rxdata, and the timing signal clkout is outputted from an output terminal of the multiplexer 12.

For example, the controller 13 allows the multiplexer 12 to output a signal Lo of the first delay element $D_0$ exclusively as an initial value, and checks whether a normal bi-level data is detected from the input signal rxdata. When a normal bi-level data is not detected from the input signal rxdata, the controller 13 allows the multiplexer 12 to output a signal $L_1$ of the next delay element $D_1$ exclusively, and checks whether a normal bi-level data is detected from the input signal rxdata. This process is repeated until a normal bi-level data is detected from the input signal rxdata. After a normal bi-level data is detected from the input signal rxdata, the controller 13 keeps the multiplexer 12 to output the signal outputted by the multiplexer 12 at that time as the timing signal clkout exclusively.

Figure 3:
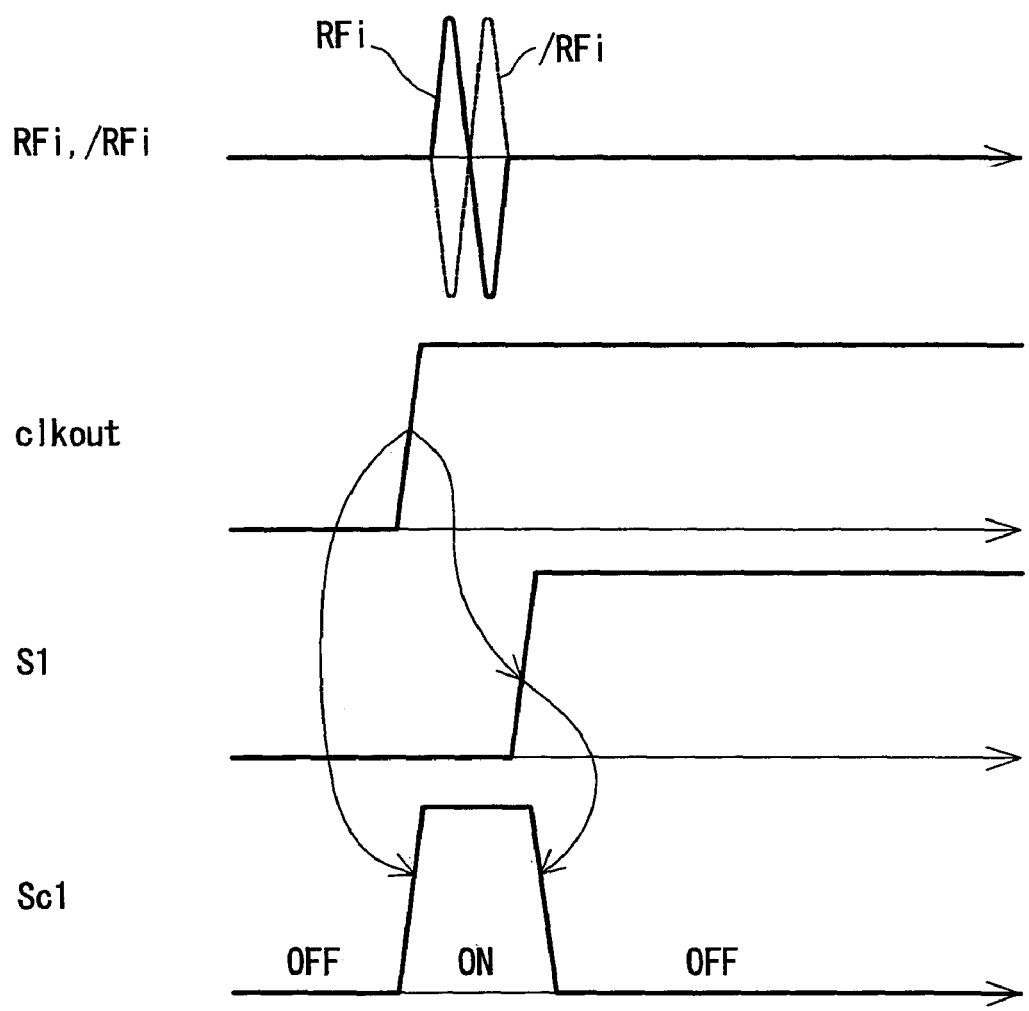
FIG. 3 is a timing chart of waveforms of various signals in the UWB receiver.

FIG. 3 is a timing chart of waveforms of various signals of the receive signals RFi, /RFi, timing signal clkout, timing signal S1 and control signal Sc1 shown in FIG. 1. FIG. 3 shows an example when a bi-level data is detected from the output signal rxdata. When the timing signal clkout becomes high level, the switch 3 is turned on to output the control signal Sc1 at high level to the amplifier 2 to activate the amplifier 2. The template pulse generator 4 delays the timing signal clkout by a predetermined delay time to output it as the signal S1 to the switch 3. When the signal S1 becomes high level, the switch 3 is turned off to output the control signal Sc1 of low level. The amplifier 2 is deactivated when the control signal Sc1 becomes low level to reduce the power consumption. As explained above, the delay time is increased successively until the correlation result exceeds a threshold. Alternatively, the timing may be controlled by using results of a plurality of correlation devices operated in parallel.

As will be appreciated in FIG. 3, the delay time of the template pulse generator 4 is set so that the control signal Sc1 to activate the amplifier 2 becomes high level only while the signals RFi and RFi are received. Thus, when the signals RFi and /RFi are not received, the electric power is not supplied to the amplifier 2 to deactivate it so as to decrease the power consumption.

Figure 4:
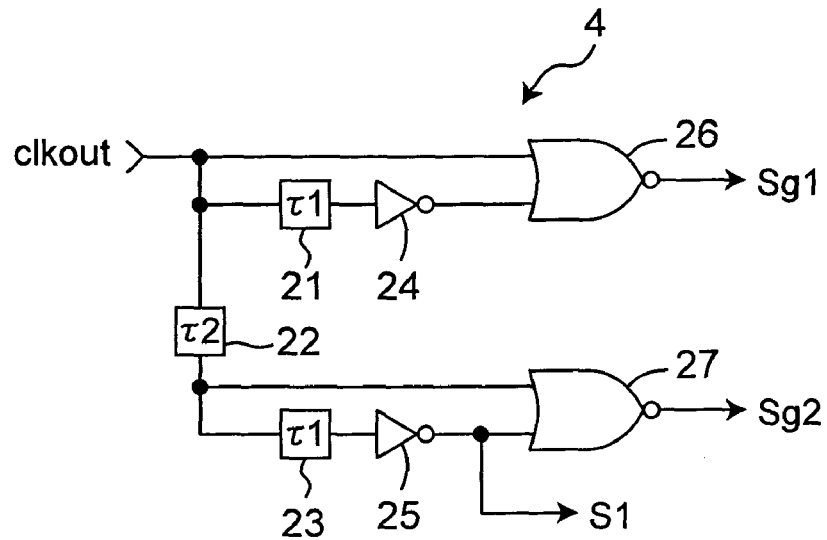
FIG. 4 is a circuit diagram of a template pulse generator in the UWB receiver.
Figure 5:
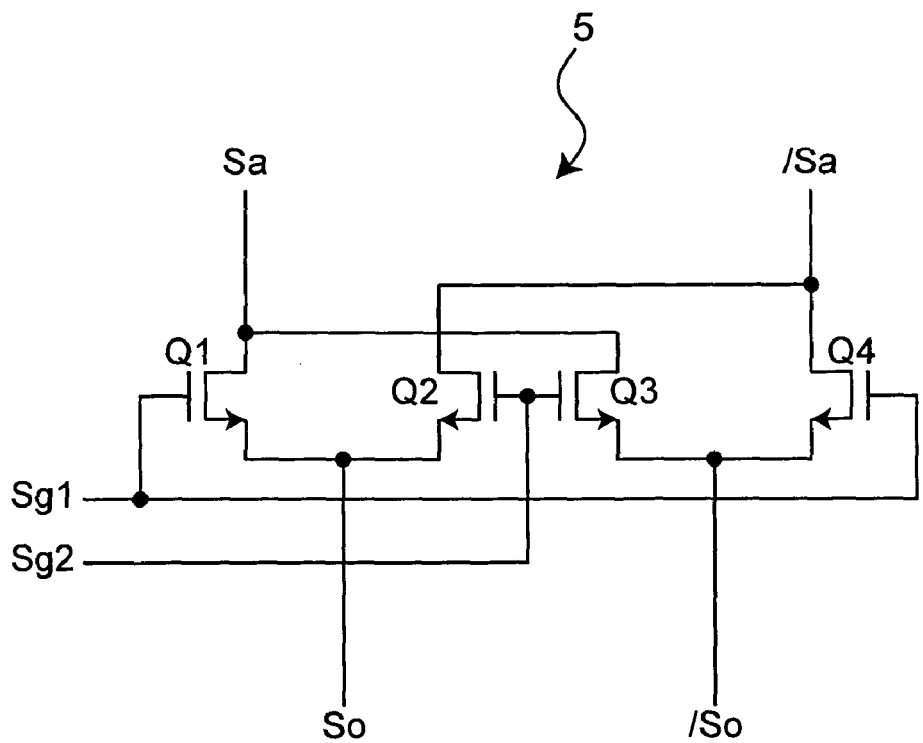
FIG. 5 is a circuit diagram of the a mixer in the UWB receiver.
Figure 6:
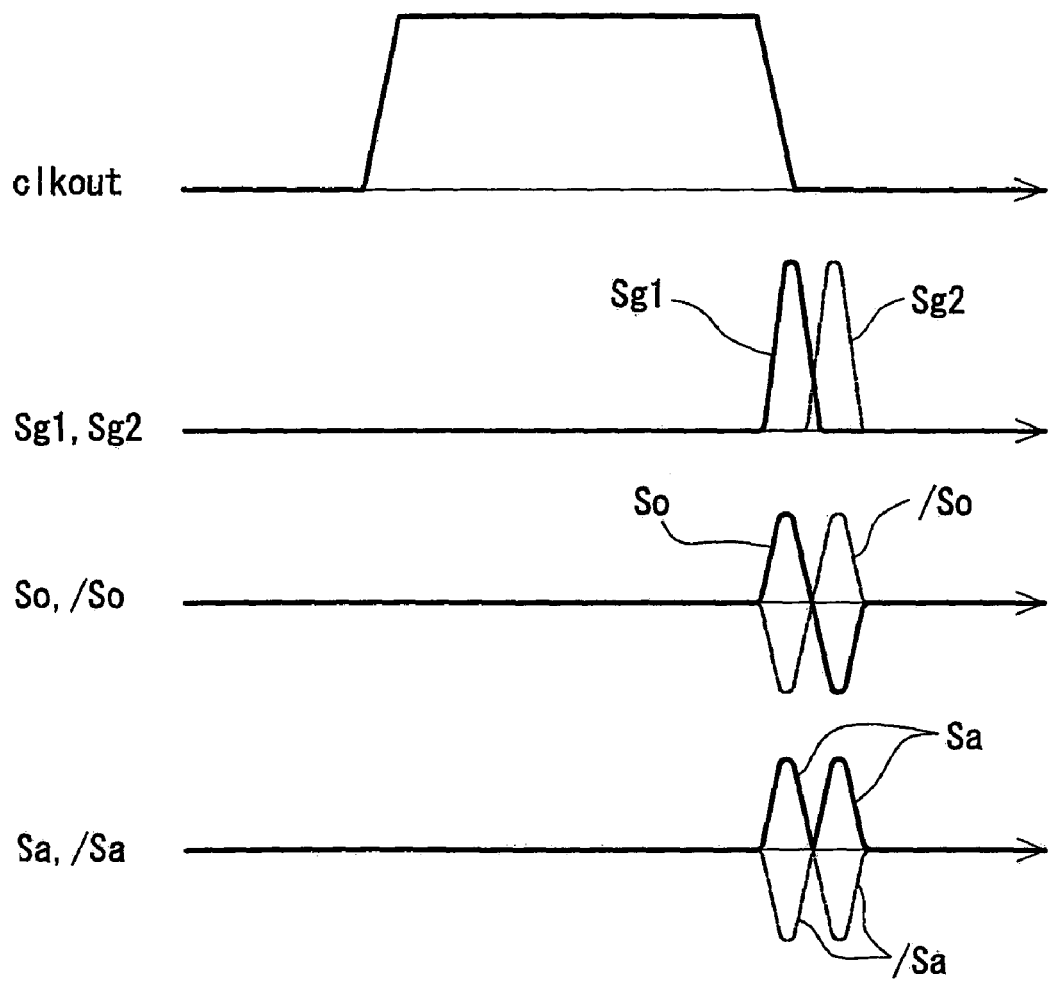
FIG. 6 is a timing chart of waveforms of various signals in the template pulse generator and in the mixer.

Next, FIG. 4 shows an example of the template pulse generator 4 in the UWB receiver, FIG. 5 shows an example of the mixer 5 in the UWB receiver, and FIG. 6 shows waveforms of various signals in the template pulse generator 4 and in the mixer 5. In FIGS. 4-6, an example for generating two single pulses is illustrated.

The template pulse generator 4 includes two NOR gates 26, 27, two inverters 24, 25 and three delay elements 21 to 23. The NOR gate 26 and the inverter 24 correspond to a first logic circuit which generates a first single pulse Sg1 based on the timing signal clkout and a signal obtained by delaying the timing signal by a first time by the delay element 21. The NOR gate 27 and the inverters 25 correspond to a second logic circuit which generates a second single pulse Sg2 based on the timing signal clkout delayed by the delay element 22 and a signal obtained by delaying the timing signal further by a first time by the delay element 23.

The delay elements 21 and 23 delay input signals by the first delay time $\tau 1$, while the delay element 22 delays an input signal by the second delay time $\tau 2$. The pulse width of each of two signal pulses Sg1, Sg2 is determined by the delay time $\tau 1$, and a pulse distance between the two signal pulses Sg1, Sg2 is determined by the second delay time $\tau 2$. Alternatively, the delay times of the delay elements 21 to 23 can be set independently of each other.

The first NOR gate 26 receives the timing signal clkout at one of the input terminals and the timing signal after delayed by the delay element 21 and inverted by the inverter 24 at the other of the input terminals. The second NOR gate 27 receives the timing signal clkout delayed by the delay element 22 at one of the input terminals and the timing signal already delayed by the delay elements 21 and 23 and inverted by the inverter 25 at the other of the input terminals. The NOR gates 26 and 27 output the single pulses Sg1 and Sg2 as shown in FIG. 6 at the output terminals thereof, respectively. The inverter 25 further outputs the signal S1 at the output terminal thereof to the switch 3. It is to be noted that the template signals Sg1, Sg2 has zero volt when the receiver does not receive input signals. Therefore, the power consumption in the mixer 4 is reduced.

Figure 22:
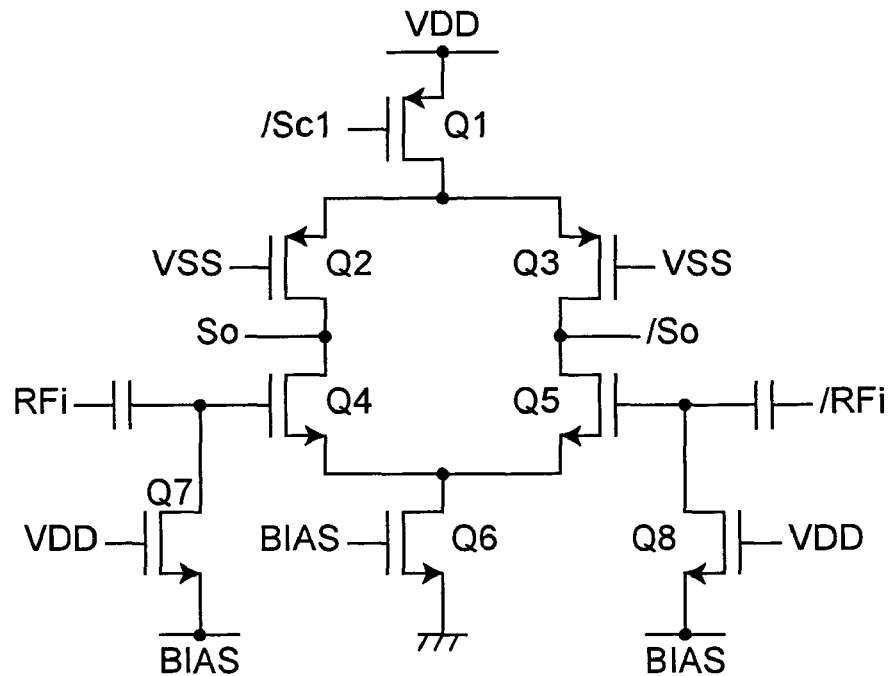
FIG. 22 is a circuit diagram of an amplifier in the UWB receiver.
Figure 23:
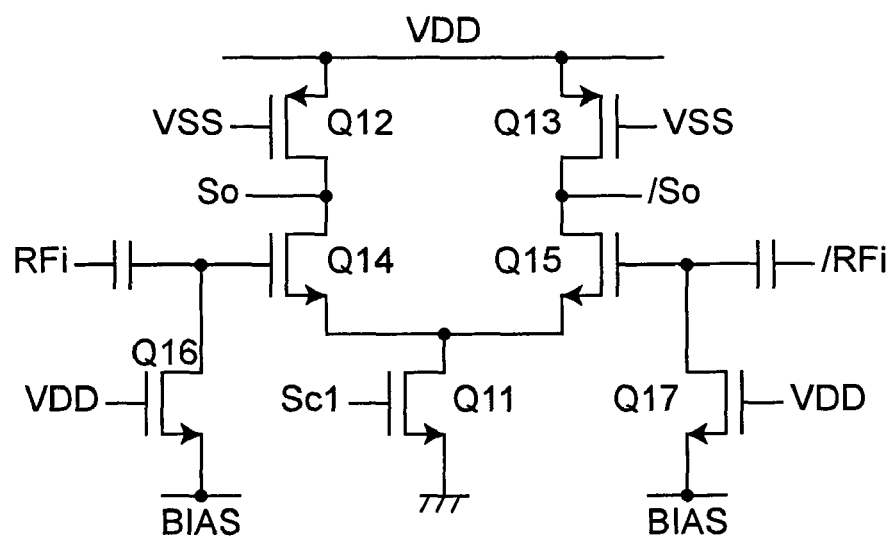
FIG. 23 is another circuit diagram of the amplifier in the UWB receiver.
Figure 24:
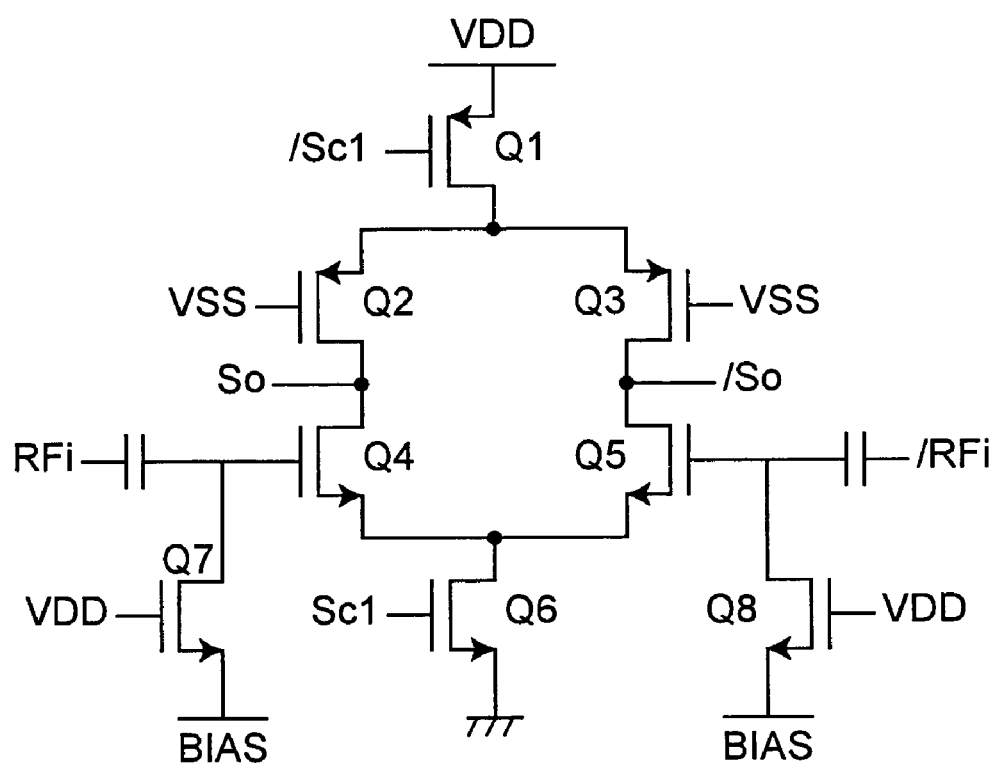
FIG. 24 is a different circuit diagram of the amplifier in the UWB receiver.

FIG. 5 shows an example a circuit diagram of the mixer 5. The mixer 5 includes four NMOS transistors Q1 to Q4. The single pulse Sg1 is received at the gates of the NMOS transistors Q1 and Q4, while the other single pulse Sg2 is received at the gates of the other NMOS transistors Q2 and Q3. Further, the output signal So from the amplifier 2 is received at to the sources of the NMOS transistors Q1 and Q2, while the other output signal /So from the amplifier 2 is received at the sources of the NMOS transistors Q3 and Q4. (Examples of the circuit diagram of the amplifier 2 are shown in FIGS. 22 to 24.) Further, the drains of the NMOS transistors Q1 and Q3 are connected to each other, and the connected node supplies the output signal Sa. Similarly, the drains of the NMOS transistors Q2 and Q4 are connected to each other, and the connected node supplies the output signal /Sa. The output signals Sa and /Sa are sent to the low pass filter 6 wherein they are integrated. The integrated signals are converted to digital signals by the A/D converter 7 to supply the output signal rxdata.

As shown in FIG. 4, the template pulse generator 4 generates two single pulses Sg1 and Sg2. Alternatively, three single pulses Sg1 to Sg3 are generated by using the template pulse generator 4 shown in FIG. 7 and the mixer 5 shown in FIG. 8.

Figure 7:
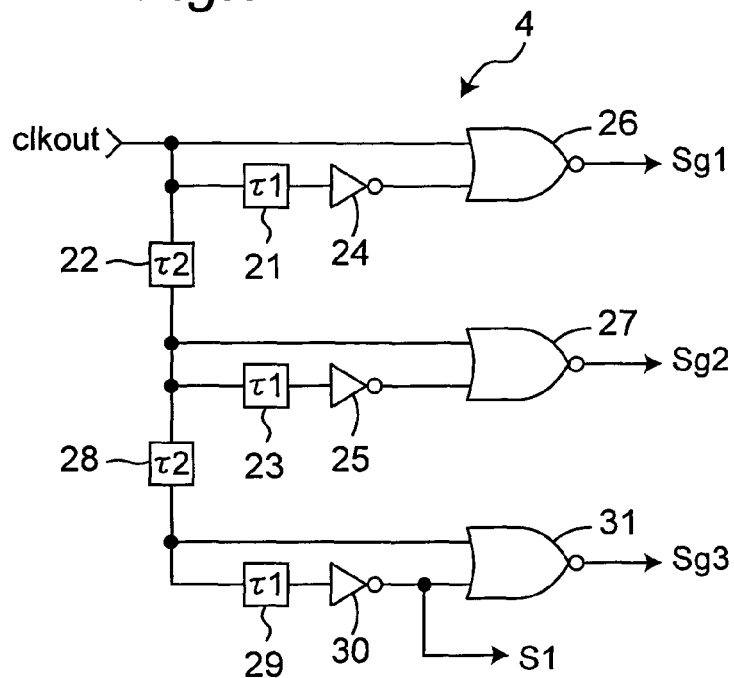
FIG. 7 is another circuit diagram of the template pulse generator in the UWB receiver.

FIG. 7 shows another example of the template pulse generator 4, which is different from that shown in FIG. 4 in that a third NOR gate 31, a third inverter 30 and delay elements 28, 29 are added. The delay element 28 delays an input signal by a second delay time $\tau 2$, and the delay element 29 delays an input signal by a first delay time $\tau 1$. The NOR gate 31 and the inverter 30 correspond to a third logic circuit which generates a third single pulse Sg3 based on the timing signal clkout delayed twice by the delay elements 22, 28 and a signal delayed further by the first delay time by the delay element 29. Each pulse width of the three single pulses Sg1 to Sg3 is determined by the first delay time $\tau 1$, and each pulse distance between the three single pulses Sg1 to Sg3 is determined by the second delay time $\tau 2$. Alternatively, the delay times of the delay elements 28 and 29 can be set independently of each other.

Figure 9:
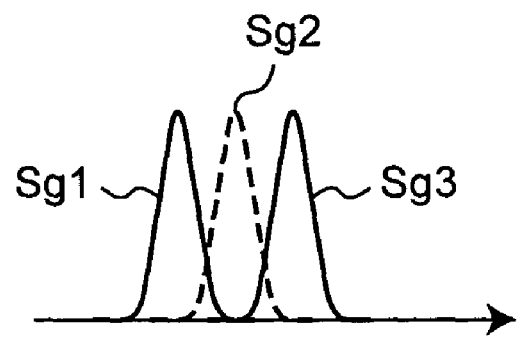
FIG. 9 is a timing chart of waveforms of single pulses sg1 to sg3.

In the template pulse generator 4 shown in FIG. 7, the NOR gate 31 receives the timing signal clkout delayed by the delay elements 22 and 24 at one of the input terminals and the timing signal already delayed by the delay elements 21, 23 and 25 and inverted by the inverter 30 at the other of the input terminals. The NOR gate 31 outputs the single pulse Ag3 as shown in FIG. 9 at the output terminal thereof. Further, the inverter 30 outputs the signal S1 to the switch 3.

Figure 8:
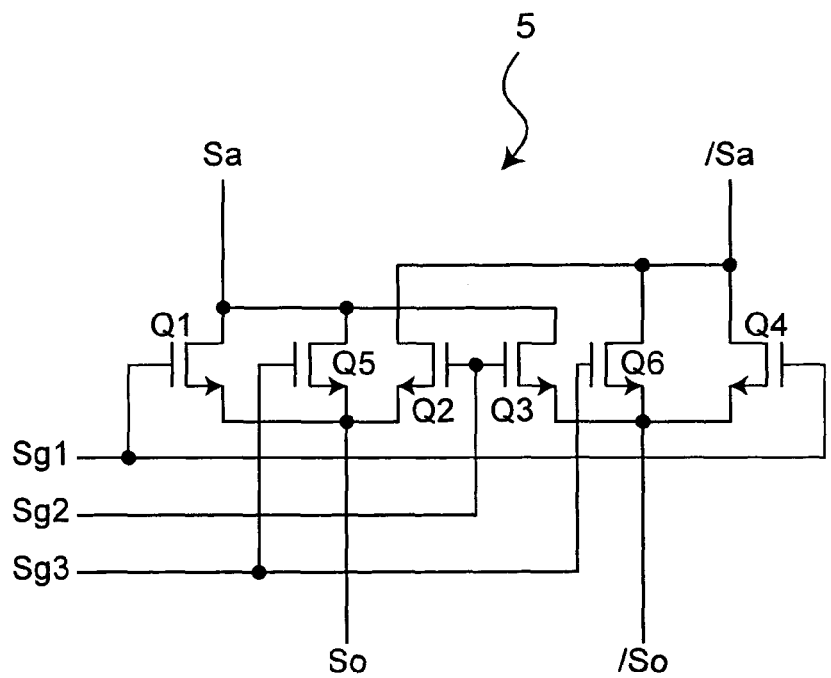
FIG. 8 is another circuit diagram of the mixer in the UWB receiver.

FIG. 8 shows another example of the mixer 5 which is different from that shown in FIG. 5 in that NMOS transistors Q5 are Q6 are added. In the mixer 5, the single pulse Sg3 is received at the gates of the NMOS transistors Q5 and Q6. Further, the output signal S0 from the amplifier 2 is received at the source of the NMOS transistor Q5, while the other output signal /S0 is received at the source of the NMOS transistor Q6. Further, the drains of the NMOS transistors Q1, Q3 and Q5 are connected to each other, and the connected node provides the output signal Sa. Similarly, the drains of the NMOS transistors Q2, Q4 and Q6 are connected to each other, and the connected node provides the output signal /Sa. In this case, the mixer 5 uses the single pulses Sg1 and Sg2 for correlation between the output signals S0 and /S0 or uses the single pulses Sg2 and Sg3 for correlation between the output signals S0 and /S0 to supply the output signals Sa and /Sa, as a result of the correlation.

Figure 10:
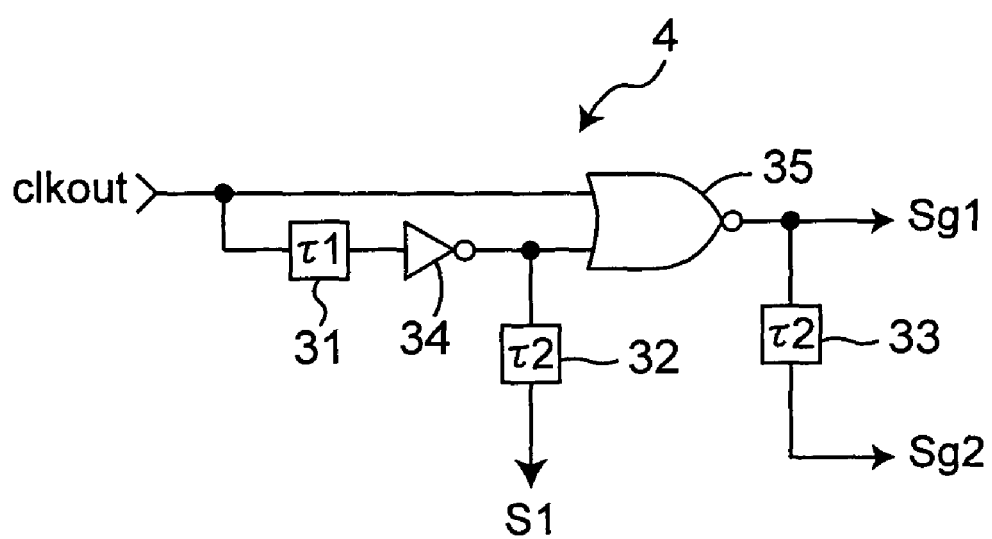
FIG. 10 is a still another circuit diagram of the template pulse generator in the UWB receiver.

FIG. 10 shows a different example of the template pulse generator 4, wherein the single pulse Sg1 is delayed to generate the single pulse Sg2, in contrast to the template pulse generator 4 shown in FIG. 4 which delays the output signal of the amplifier 2. The template pulse generator 4 shown in FIG. 10 includes a NOR gate 35, an inverter 34 and delay elements 31 to 33. The NOR gate 35 and the inverter 34 correspond to a logic circuit which generates a single pulse Sg1 based on the timing signal and a signal obtained by delaying the timing signal by a first time by the delay element 31 and inverted by the inverter 34.

The delay element 31 delays an input signal by a first delay time $\tau 1$, and the delay elements 32 and 33 delay input signals by a second delay time $\tau 2$. Each pulse width of two single pulses Sg1 and Sg2 is determined by the first delay time $\tau 1$, and a pulse interval between the two single pulses Sg1 and Sg2 is determined by the second delay time $\tau 2$. Alternatively, the delay times of the delay elements 31 to 33 can be set independently of each other.

The NOR gate 35 receives the timing signal clkout at one of the input terminals and the timing signal after delayed by the delay element 31 and inverted by the inverter 34 at the other of the input terminals. The NOR gate 35 outputs a single pulse Sg1 as shown in FIG. 6 at the output terminal thereof. The inverter 34 further outputs a signal S1 delayed by the delay element 32 to be sent to the switch 3.

In the template pulse generator 4 shown in FIG. 10, two single pulses Sg1 and Sg2 are generated. Alternatively, three single pulses Sg1 to Sg3 are generated by using the template pulse generator 10 shown in FIG. 11 and the mixer 5 shown in FIG. 8.

Figure 11:
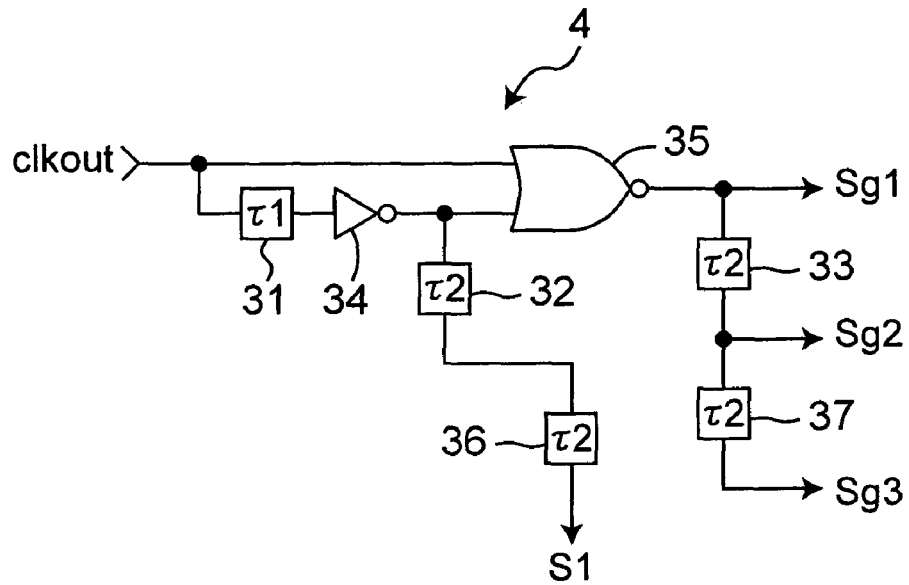
FIG. 11 is a yet another circuit diagram of the template pulse generator in the UWB receiver.

FIG. 11 shows a still different example of the template pulse generator 4, which is different from that shown in FIG.

10 in that delay elements 36 and 37 are added. The delay elements 36 and 37 delay input signals by the second delay time τ2 similarly to the delay elements 32, 33. Each pulse width of the three single pulses Sg1 to Sg3 is determined by the first delay time τ1, and each pulse distance of the three single pulses Sg1 to Sg3 is determined by the second delay time τ2. Alternatively, the delay times of the delay elements 36 and 37 can be set independently of each other.

In the template pulse generator 4 shown in FIG. 11, the delay element 37 delays a single pulse Sg2 further to generate a single pulse Sg3 as shown in FIG. 9. Further, the delay element 36 delays the signal delayed by the delay element 32 to generate a signal S1 to be supplied to the switch 3. The mixer 5 shown in FIG. 5 is used for the template pulse generator 4 shown in FIG. 11, and the explanation of the mixer is omitted here.

Figure 12:
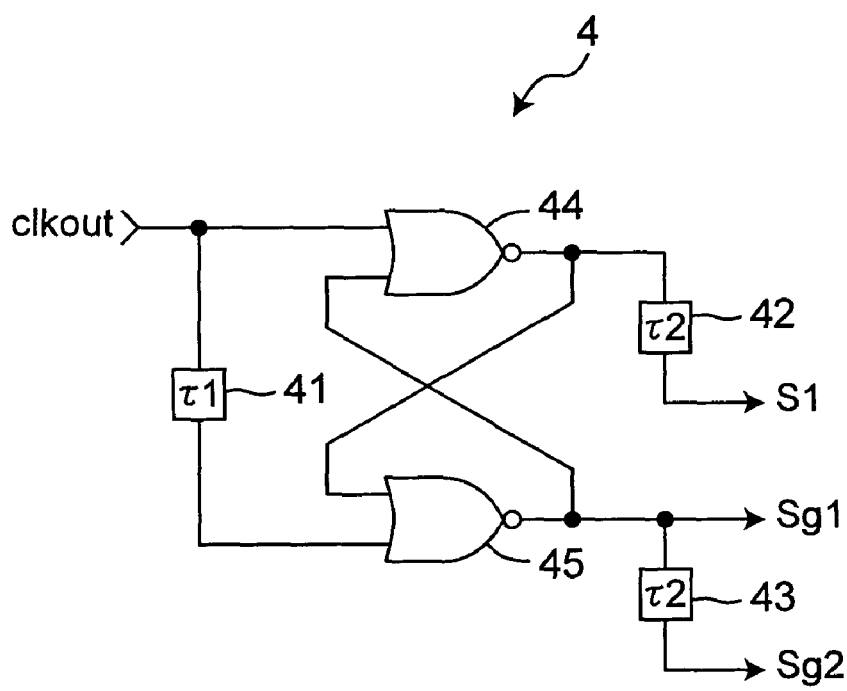
FIG. 12 is a still yet another circuit diagram of the template pulse generator in the UWB receiver.
Figure 13:
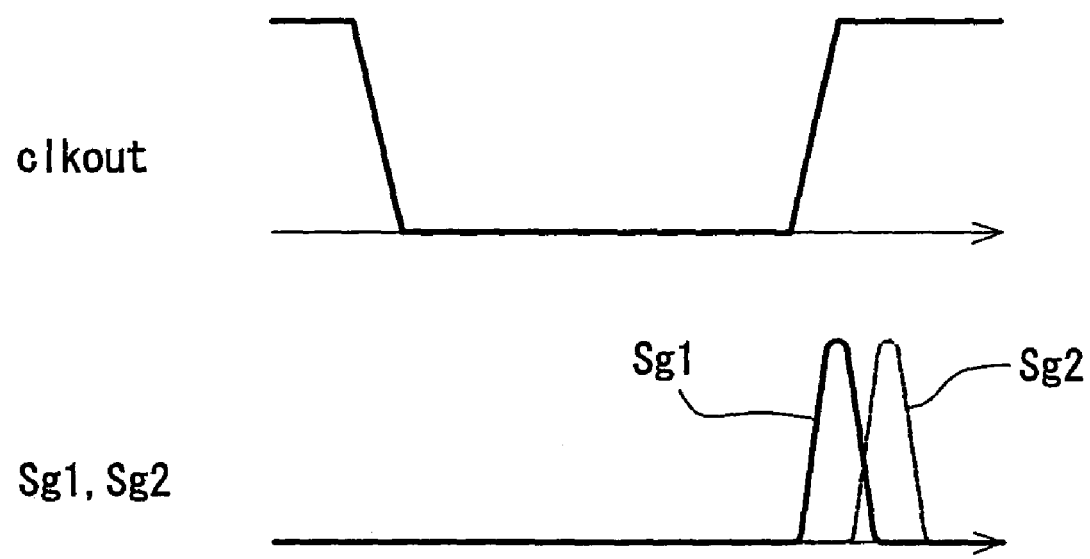
FIG. 13 is a diagram of waveforms of signals in the template pulse generator shown in FIG. 12.

Next, FIG. 12 shows another example of the template pulse generator 4, and FIG. 13 shows an example of waveforms of various signals in the template pulse generator in a case when two single pulses are generated. The template pulse generator 4 includes two NOR gates 44, 45 and three delay elements 41 to 43. The NOR gates 44 and 45 correspond to a logic circuit which generates a first single pulse based on the timing signal and a signal obtained by delaying the timing signal by a first time.

The delay element 41 delays an input signal by a first delay time τ1, and the delay elements 42 and 43 delay input signals by a second delay time τ2. Each pulse width of two single pulses is determined by the first delay time τ1, and a pulse interval between the two single pulses is determined by the second delay time τ2. Alternatively, the delay times of the delay elements 41 to 43 can be set independently of each other.

The first NOR gate 44 receives the timing signal clkout at one of the input terminals, and the other of the input terminals is connected to the output terminal of the second NOR gate 45. The second NOR gate 45 receives the timing signal clkout delayed by the delay element 41 at one of the input terminals, and the other of the input terminals is connected to the output terminal of the first NOR gate 44. The second NOR gate 45 outputs a single pulse Sg1 as shown in FIG. 13 at the output terminal thereof, while the first NOR gate 44 outputs a signal S1 after delayed by the delay element 42 to the switch 3 as signal S1.

In the template pulse generator 4 shown in FIG. 12, two single pulses Sg1 and Sg2 are generated. Alternatively, three single pulses Sg1 to Sg3 are generated by using the template pulse generator 4 shown in FIG. 14 and the mixer 5 shown in FIG. 8.

Figure 14:
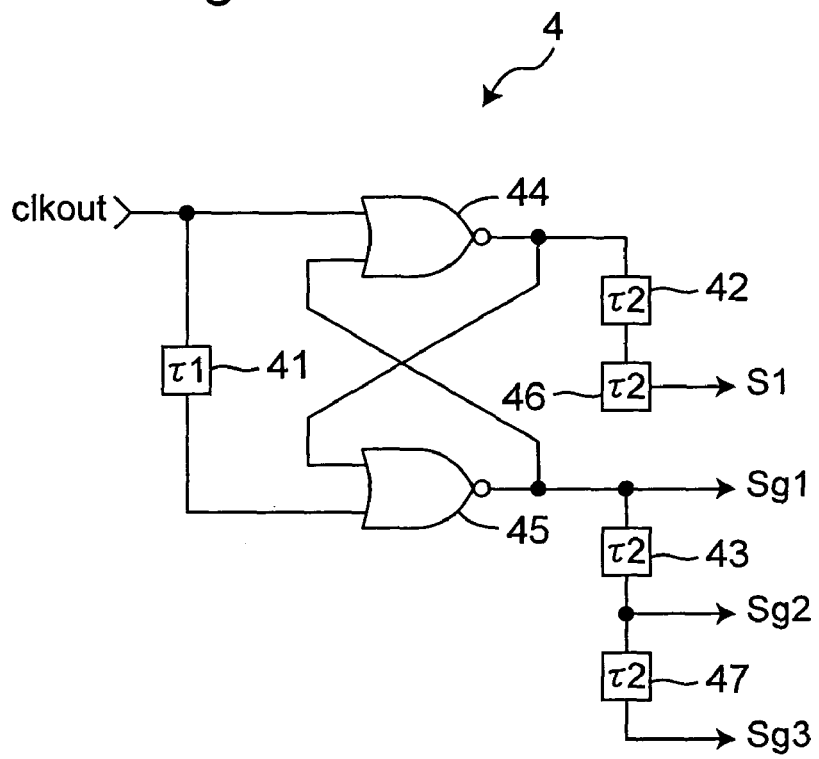
FIG. 14 is a further circuit diagram of the template pulse generator in the UWB receiver.

FIG. 14 shows a further example of the template pulse generator 4 different from that shown in FIG. 12 in that delay elements 46 and 47 are added. The delay elements 46 and 47 delay input signals further by the second delay time τ2 similarly to the delay elements 42, 43. Each pulse width of the three single pulses Sg1 to Sg3 is determined by the first delay time τ1, and each pulse distance of the three single pulses Sg1 to Sg3 is determined by the second delay time τ2. Alternatively, the delay times of the delay elements 46 and 47 can be set independently of each other.

In the template pulse generator 4 shown in FIG. 14, the delay element 47 delays the single pulse Sg2 to generate a single pulse Sg3 as shown in FIG. 9. Further, the delay element 46 delays the signal already delayed by the delay element 42 to generate a signal S1 to be supplied to the switch 3. The mixer 5 shown in FIG. 5 is used for the template pulse generator 4 shown in FIG. 14, and the explanation of the mixer is omitted here.

Figure 15:
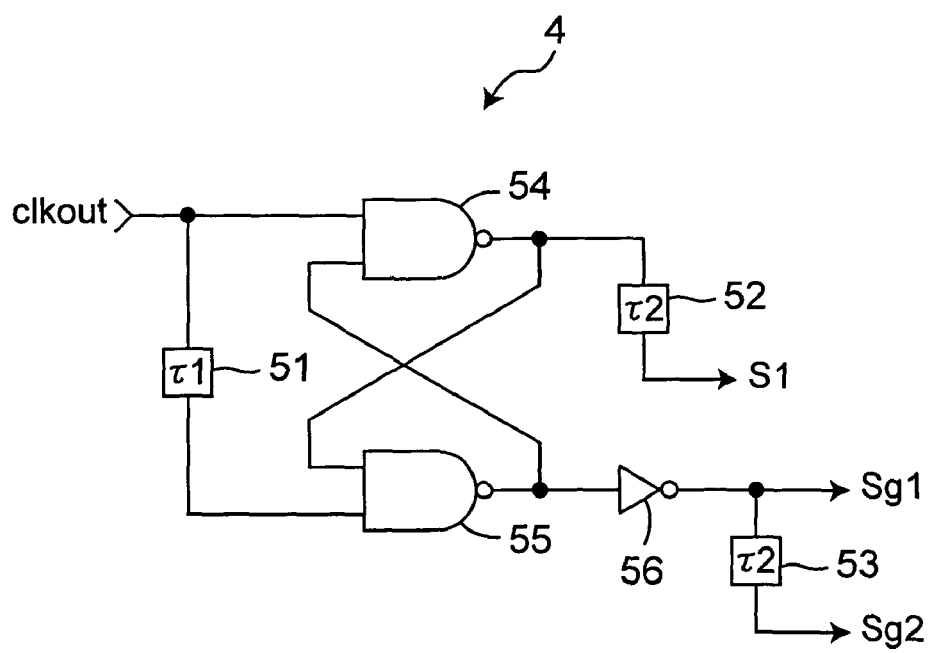
FIG. 15 is a still further circuit diagram of the template pulse generator in the UWB receiver.

The template pulse generator 4 shown in FIG. 12 may be replaced by that shown in FIG. 15 wherein the NOR gates used in FIG. 12 are replaced with NAND gates. The template pulse generator shown in FIG. 15 has two NAND gates 54, 55, an inverter 56 and three delay elements 51 to 53. The NAND gates 54, 55 and the inverter 56 correspond to the logic circuit which generates a first single pulse Sg1 based on the timing signal and a signal obtained by delaying the timing signal by a first time.

The delay element 51 delays an input signal by a first delay time τ1, and the delay elements 52 and 53 delay input signals by a second delay time τ2. Each pulse width of two single pulses Sg1 and Sg2 is determined by the first delay time τ1, and a pulse interval between the two single pulses Sg1 and Sg2 is determined by the second delay time τ2. Alternatively, the delay times of the delay elements 51 to 53 can be set independently of each other.

The first NAND gate 54 receives the timing signal clkout at one of the input terminals, and the other of the input terminals is connected to the output terminal of the second NAND gate 55. The NAND gate 55 receives the timing signal clkout delayed by the delay element 51 at one of the input terminals, and the other of the input terminals is connected to the output terminal of the first NAND gate 54. The second NAND gate 55 outputs the single pulse Sg1, inverted by the inverter 56 to be outputted as shown in FIG. 13, while the single pulse Sg1 is delayed by the delay element to output a single pulse Sg2. Further, the NAND gate 54 outputs a signal S1 delayed by the delay element 52 to the switch 3.

In the template pulse generator 4 shown in FIG. 15, two single pulses Sg1 and Sg2 are generated. Alternatively, three single pulses Sg1 to Sg3 are generated by using the template pulse generator 4 shown in FIG. 16 and the mixer 5 shown in FIG. 8.

Figure 16:
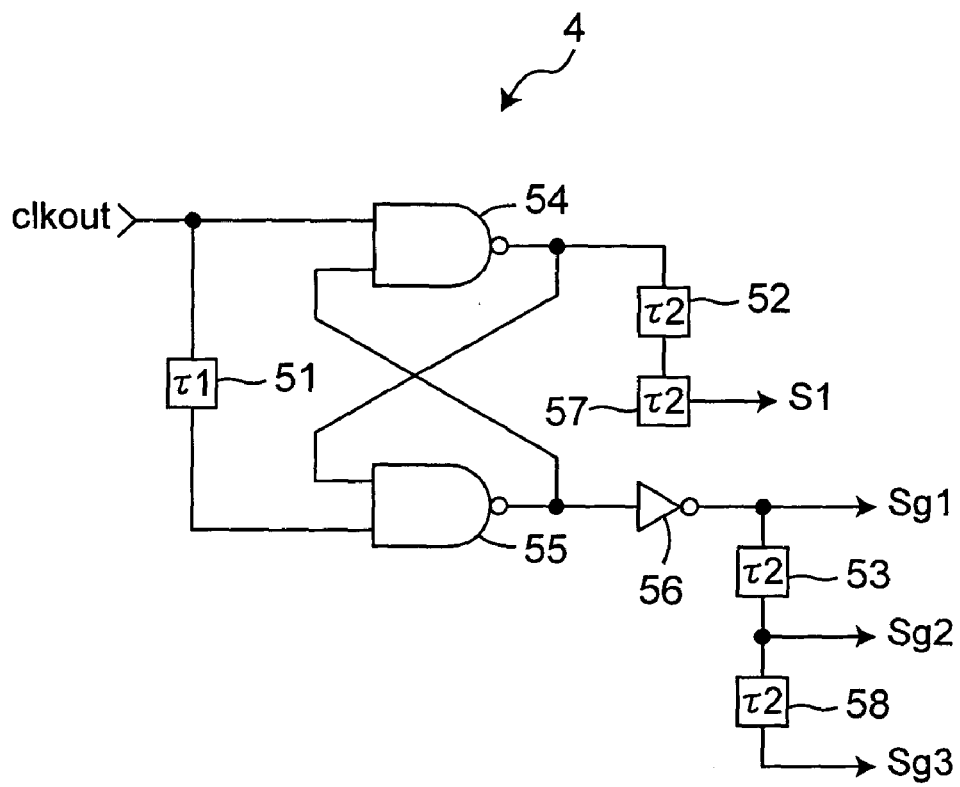
FIG. 16 is a yet further circuit diagram of the template pulse generator in the UWB receiver.

FIG. 16 shows a still different example of the template pulse generator 4 different from that shown in FIG. 15 in that delay elements 57 and 58 are added. The delay elements 57 and 58 delay input signals by the second delay time τ2 similarly to the delay elements 52, 53. Each pulse width of three single pulses Sg1, Sg2 and Sg3 is determined by the first delay time τ1, and each pulse interval between the three single pulses Sg1, Sg2 and Sg3 is determined by the second delay time τ2. Alternatively, the delay times of the delay elements 57 and 58 can be set independently of each other.

In the template pulse generator 4 shown in FIG. 16, the delay element 58 delays the single pulse Sg2 to generate a single pulse Sg3 as shown in FIG. 9. Further, the delay element 57 delays the signal delayed by the delay element 52 to generate a signal S1 to be supplied to the switch 3. The mixer 5 shown in FIG. 5 is used for the template pulse generator 4 shown in FIG. 16, and the explanation of the mixer is omitted here.

Figure 17:
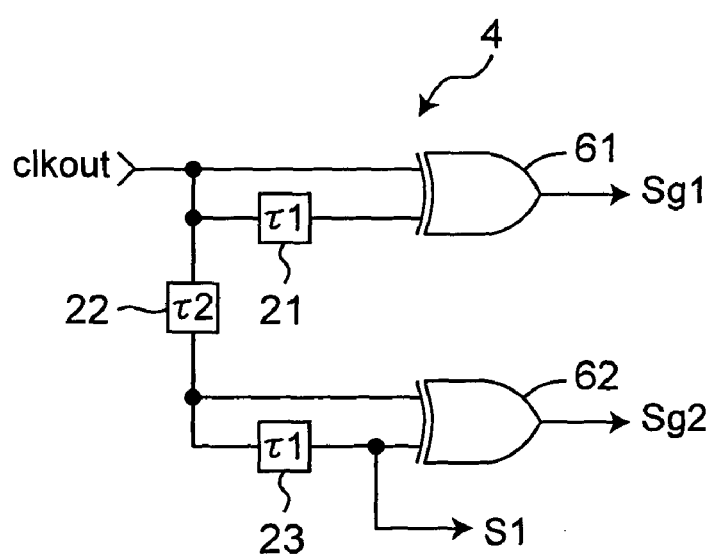
FIG. 17 is a still yet further circuit diagram of the template pulse generator in the UWB receiver.

FIG. 17 shows a further example of the template pulse generator 4. As shown in FIG. 17, the NOR gates 26 and 27 used in FIG. 4 may be replaced with ExOR gates 61 and 62. In this case, the inverters 24 and 25 are omitted. The template pulse generator shown in FIG. 17 has the two ExOR gates 61, 62 and three delay elements 21 to 23. The ExOE gate 61 corresponds to the first logic circuit, and the ExOE gate 62 corresponds to the second logic circuit. The ExOR gate 61 receives the timing signal clkout at one of the input terminals and a timing signal clkout delayed by the delay element 21 at the other thereof.

Figure 18:
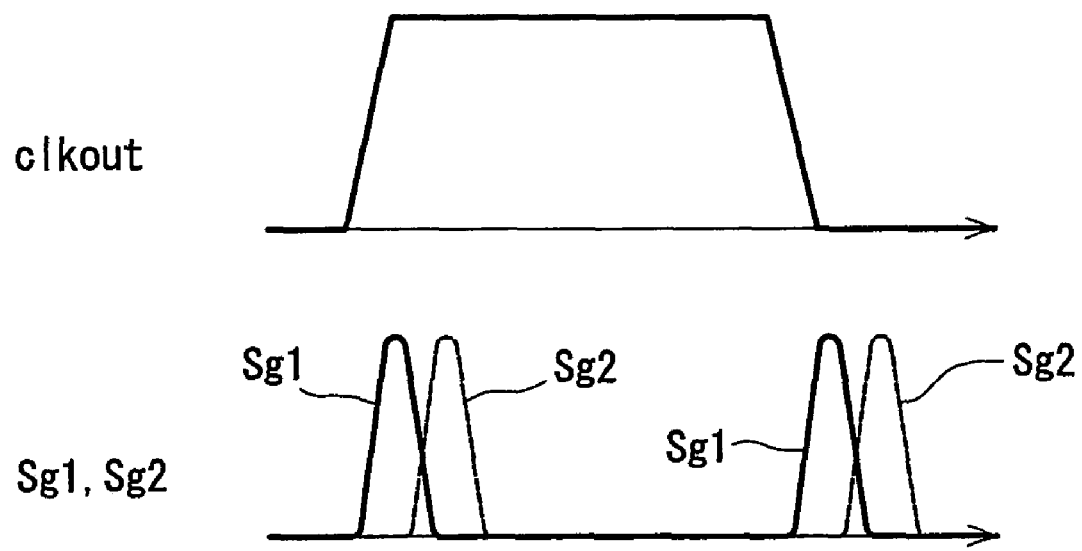
FIG. 18 is a timing chart of waveforms of signals in the template pulse generator shown in FIG. 17.

The second ExOR gate 62 receives the timing signal clkout delayed by the delay element 22 at one of the input terminals and the timing signal clkout delayed by the delay elements 22 and 23 at the other of the input terminals. The first ExOR gate 61 outputs a single pulse Sg1 as shown in FIG. 18, while the second ExOR gate 62 outputs a single pulse Sg21 as shown in FIG. 18. The delay element 23 outputs a signal S1 to the switch 3.

Figure 19:
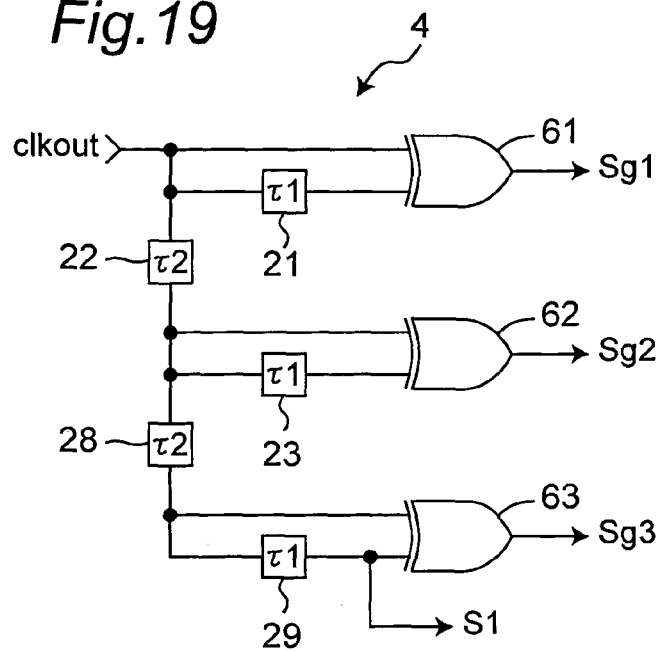
FIG. 19 is a different circuit diagram of the template pulse generator in the UWB receiver.

Similarly, as shown in FIG. 19, the NOR gates N1 to N3 shown in FIG. 7 are replaced with ExOR gates 61 to 63. In this example, the inverters 24, 24 and 29 are omitted. The template pulse generator 4 shown in FIG. 19 is different from that shown in FIG. 17 in that the third ExOR gate 63 and delay elements 28 and 29 are added. The third ExOR gate 63 corresponds to a logic circuit which generates a single pulse based on a signal obtained by delaying the timing signal by a second time twice and another signal obtained by delaying the delayed timing signal further by a first time.

In the template pulse generator 4 shown in FIG. 19, the third ExOR gate 63 receives the timing signal clkout delayed by the delay elements 22 and 28 at one of the input terminals, and to generate the timing signal clkout delayed by the delay elements 22, 28 and 29 at the other thereof. The third ExOR gate 63 outputs a single pulse Sg3 as shown in FIG. 9, and the delay element 29 outputs a signal S1 to the switch 3.

Figure 20:
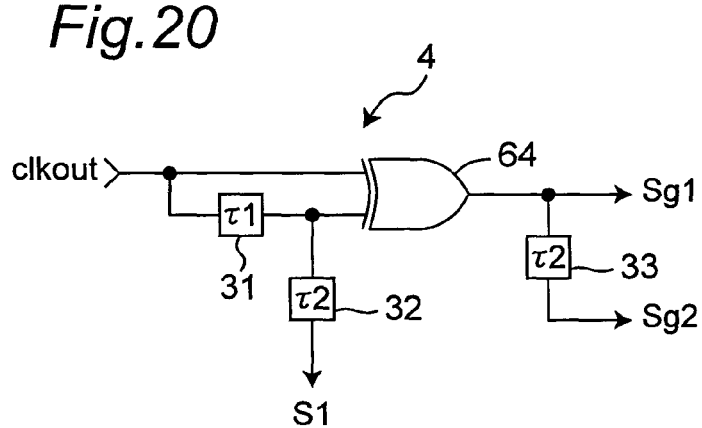
FIG. 20 is a still different circuit diagram of the template pulse generator in the UWB receiver.

Further, as shown in FIG. 20, the NOR gate 35 used in the template pulse generator 4 shown in FIG. 10 may be replaced with an ExOR gate 64. In this case, the inverter 34 shown in FIG. 10 is omitted. The template pulse generator 4 shown in FIG. 20 consists of the ExOR gate 64 and delay elements 31 to 33. The ExOR gate 64 corresponds to a logic circuit which generates a single pulse based on the timing signal and a signal obtained by delaying the timing signal by a first time.

The ExOR gate 64 receives the timing signal clkout at one of the input terminals and the timing signal clkout delayed by the delay element 31 at the other of the input terminals. The ExOR gate 64 outputs a single pulse Sg1, and the delay element 33 delays the output signal to output a single pulse Sg2 as shown in FIG. 18. The delay element 32 outputs a signal S1 to the switch 3.

Figure 21:
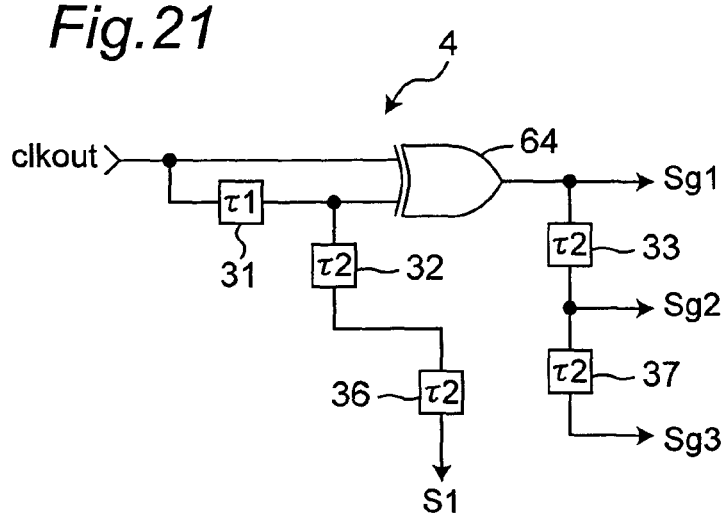
FIG. 21 is a yet still different circuit diagram of the template pulse generator in the UWB receiver.

Similarly, as shown in FIG. 21, the NOR gate 35 may be replaced with an ExOR gate 64 in the circuit shown in FIG. 11. In this case, the inverter 34 shown in FIG. 11 is omitted. The template pulse generator 4 shown in FIG. 21 is different from that shown in FIG. 20 in that delay elements 36 and 37 are added.

In the template pulse generator 4 shown in FIG. 21, the delay element 37 delays the single pulse Sg2 to generate single pulse Sg3 as shown in FIG. 9. Further, the delay element 36 delays the signal delayed already by the delay element 32 to generate a signal S1 to be supplied to the switch 3. The mixer 5 shown in FIG. 5 is used for the template pulse generator 4 shown in FIG. 21, and the explanation of the mixer is omitted here.

Next, FIG. 22 shows an example of the amplifier 2. In the amplifier 2, a PMOS transistor Q1 connected to power supply voltage $V_{DD}$ receives the inverted signal /Sc1 of the control signal Sc1 at the gate thereof. When the power supply to the amplifier 2 is stopped to deactivate it, the PMOS transistor Q1 is turned off so that the power supply from $V_{DD}$ is stopped. Then, the amplifier 2 is deactivated. It is to be noted that a circuit for inverting the control signal Sc1 is not shown in FIG. 22.

FIG. 23 shows another example of the amplifier 2 wherein an NMOS transistor Q11 connected to the ground voltage or the negative side of the power supply voltage receives the control signal Sc1 at the gate thereof. When the power supply to the amplifier 2 is stopped to deactivate the amplifier, the NMOS transistor Q11 is turned off so that electric current does not flow through NMOS transistors Q12 and Q13 and through NMOS transistors Q14 and Q15 provided for differential operation. Thus the amplifier 2 is deactivated.

Alternatively, as shown in FIG. 24, the PMOS transistor Q1 and the NMOS transistor Q6 may be turned off when the operation of the transistors Q1 and Q6 is controlled by the control signal Sc1 to deactivate the amplifier 2. In this example, the control signal Sc1 is supplied to the gate of the NMOS transistor Q6. In FIG. 24, a circuit for inverting the signal level of the control signal Sc1 is omitted.

As explained above, in ultra-wideband radio transmission according to the invention, the power supply for the amplifier 2 is stopped when the short pulses are not received, because a carrier wave is not used and discontinuous short pulses are used. Then, the power consumption in the UWB receiver can be reduced largely. This advantage depends on the pulse width and the pulse period. As the data rate is decreased, the reduction in power consumption is enhanced. For example, when the duty ratio of the pulses is 1:100, for example, for the pulse width 1 nsec and the pulse period of 100 nsec, the power consumption of the amplifier 2 becomes one hundredth. Further, the timing control of the switch 3 for stopping power supply to the amplifier 2 is controlled by the timing of the template signals Stem inputted to the mixer at the following stage. Then, it is not needed to introduce a new circuit for the control of the switch 3. The switch 3 itself can be made of one PMOS transistor or NMOS transistor.

Further, because single pulses are used as the template signals $S_{tem}$ for correlation with the receive signals, the template pulse generator 4 is fabricated as a digital circuit. Therefore, it is not necessary to use passive elements such as resistors, capacitors, or bipolar transistors. For example, it can be constructed as a simple CMOS circuit. Thus, an area occupied by the circuit can be decreased, and the circuit can be integrated efficiently.

Figure 25:
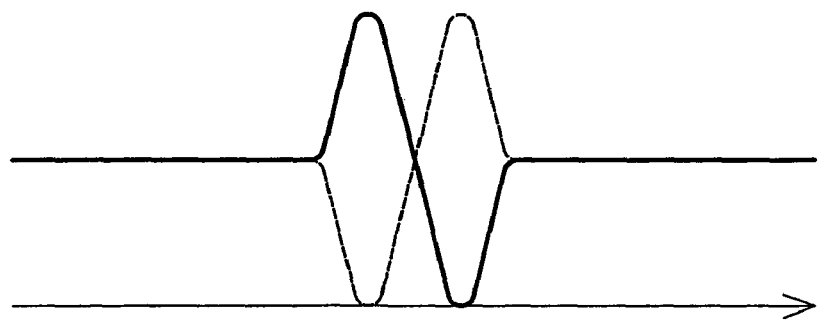
FIG. 25 is a diagram of a waveform of a prior art template signal.

A prior art template signal consists of discontinuous pulse signals similarly to the receive signals as shown in FIG. 25. When such template signals are used, even when no signal is received, a biased voltage is applied to the NMOS transistor in the mixer, and electric current flows through the NMOS transistor to consume the electric power. Then the power consumption is a problem in a situation when no signals are received for a long time in UWB transmission. Further, the single pulses generated by the template signal of the invention have zero voltage while signals are not received. Then, the NMOS transistors in the mixer 5 are turned off, and no electric current flows through the NMOS transistors. Thus, the power consumption is reduced further. The consumed electric power depends on a circuit connected to the output terminal of the mixer 5, but an advantage of decreasing the power consumption by 1/10 is generally realized at 10 Mbps.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An ultra-wideband receiver which receives discontinuous pulse signals without a carrier wave and demodulates them, comprising:
   an amplifier which amplifies the received signals comprising the discontinuous pulse signals without a carrier wave;
   a demodulator which demodulates the signals amplified by said amplifier; and a controller which controls said amplifier based on the signals demodulated by said demodulator;

wherein said controller outputs a timing signal having pulse signals generated so as to have a data from the signal demodulated by said demodulator and generates a control signal based on the timing signal during a predetermined period, and said amplifier amplifies the received signals only when the control signal is received, and said controller deactivates said amplifier while the control signal is not received; and wherein said demodulator includes a mixer made of an analog circuit and an analog-to-digital converter, and said demodulator demodulates the received signals by generating a plurality of single pulses, multiplies the signals amplified by said amplifier with each of the plurality of single pulses by the mixer, integrates the multiplied signals and converts the integrated signals to digital values by the analog-to-digital converter.

2. The ultra-wideband receiver according to claim 1, wherein said demodulator comprises:

a template pulse generator which generates template signals including the plurality of single pulses based on the timing signal; and wherein said mixer multiplies the amplified signals with the single pulses generated by said template pulse generator.

3. The ultra-wideband receiver according to claim 2, wherein said template pulse generator is a digital circuit comprising:

a plurality of first delay elements for delaying an input signal by a first delay time;

at least one second delay element for delaying an input signal by a second delay time;

a first logic circuit which generates one of the single pulses based on the timing signal and a signal obtained by delaying the timing signal by a first delay time by one of said first delay elements; and a second logic circuit which generates another of the single pulses based on a signal obtained by delaying the timing signal by the second time by said second delay element and another signal obtained by delaying the delayed timing signal further by the first time by one of said first delay elements.

4. The ultra-wideband receiver according to claim 3, wherein said template pulse generator further comprises a third logic circuit which generates a further single pulse in the single pulses based on a signal obtained by delaying the timing signal by the second time twice and another signal obtained by delaying the delayed timing signal further by the first time by said second delay element.

5. The ultra-wideband receiver according to claim 2, wherein said template pulse generator is a digital circuit comprising:

a first delay element for delaying an input signal by a first delay time;

a plurality of second delay elements for delaying an input signal by a second delay time; and a logic circuit which generates one of the single pulses based on the timing signal and a signal obtained by delaying the timing signal by the first time by said first delay element;

wherein one of said second delay elements generates another of the single pulses by delaying the first single pulse by the second time.

6. The ultra-wideband receiver according to claim 5, wherein said second delay circuit delays the second single pulse by a predetermined delay time to generate and output a further single pulse in the single pulses.

7. The ultra-wideband receiver according to claim 3, wherein said controller sends a signal to said amplifier to activate said amplifier when the signals are received and to deactivate said amplifier when the signals are not received, and said controller uses a delayed signal generated in said template pulse generator to deactivate said amplifier.

8. The ultra-wideband receiver according to claim 1, wherein the controller delays an input clock signal by a delay time to generate the timing signal, where the delay time is changed until a bi-level signal is detected based on the signals demodulated by said demodulator, and the controller includes a first delay element, a second delay element, and a multiplexer, where an output of the first delay element is connected to an input of the second delay element, the output of the first delay element is connected to a first input terminal of the multiplexer and an output of the second delay element is connected to a second input terminal of the multiplexer, the input of the first delay element receives the input clock signal, and the controller controls the multiplexer according to the based on the signals demodulated by said demodulator, wherein the controller allows the multiplexer to output a signal of the first delay element exclusively as an initial value, and checks whether a bi-level data is detected based on the signals demodulated by said demodulator, when a bi-level data is not detected based on the signals demodulated by said demodulator, the controller allows the multiplexer to output a signal of the second delay element exclusively, and checks whether a bi-level data is detected based on the signals demodulated by said demodulator, and after a bi-level data is detected based on the signals demodulated by said demodulator, the controller allows the multiplexer to output a signal of the first delay element and a signal of the second delay element from the multiplexer based on the timing signal exclusively.

* * * * *

UNITED STATES PATENT AND TRADEMARK OFFICE
CERTIFICATE OF CORRECTION

| | |
|---|---|
| PATENT NO. | : 7,869,548 B2 |
| APPLICATION NO. | : 11/051630 |
| DATED | : January 11, 2011 |
| INVENTOR(S) | : Takahide Terada et al. |

It is certified that error appears in the above-identified patent and that said Letters Patent is hereby corrected as shown below:

ON THE TITLE PAGE:

At page 2, in item (56), References Cited, under "OTHER PUBLICATIONS", correct the title of the Immoreev et al. publication to read:

-- "Ultra-wideband and communication system with high data rate" --.

At page 2, in item (56), References Cited, under "OTHER PUBLICATIONS", correct the publication date of the Lee et al. publication from "Dec. 2000" to -- Dec. 2002 --.

Signed and Sealed this
Twelfth Day of April, 2011

David J. Kappos
*Director of the United States Patent and Trademark Office*